US007640220B2

(12) United States Patent
Acharya (10) Patent No.: US 7,640,220 B2
(45) Date of Patent: Dec. 29, 2009

(54) OPTIMAL TAXONOMY LAYER SELECTION METHOD

(75) Inventor: Chiranjit Acharya, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 491 days.

(21) Appl. No.: 11/457,095

(22) Filed: Jul. 12, 2006

(65) Prior Publication Data

US 2007/0271279 A1  Nov. 22, 2007

Related U.S. Application Data

(63) Continuation-in-part of application No. 11/436,142, filed on May 16, 2006.

(51) Int. Cl.
  *G06N 1/00* (2006.01)
  *G06N 7/00* (2006.01)
(52) U.S. Cl. .............................. 706/45; 706/46; 706/47
(58) Field of Classification Search ........................ None
  See application file for complete search history.

(56) References Cited

U.S. PATENT DOCUMENTS

| 6,460,036 | B1 | 10/2002 | Herz |
| 2002/0042793 | A1 | 4/2002 | Choi |
| 2003/0126561 | A1* | 7/2003 | Woehler et al. ............. 715/531 |
| 2003/0177000 | A1 | 9/2003 | Mao et al. |
| 2003/0217052 | A1 | 11/2003 | Rubenczyk et al. |
| 2004/0111438 | A1* | 6/2004 | Chitrapura et al. .......... 707/200 |
| 2005/0044487 | A1 | 2/2005 | Bellegarda et al. |
| 2006/0004747 | A1* | 1/2006 | Weare ............................ 707/5 |
| 2006/0031217 | A1 | 2/2006 | Smith et al. |
| 2006/0095521 | A1 | 5/2006 | Patinkin |

OTHER PUBLICATIONS

U.S. Appl. No. 11/436,142, filed May 16, 2006 Acharya et al.
U.S. Appl. No. 11/457,064, filed Jul. 12, 2006 Acharya et al.
U.S. Appl. No. 11/457,090, filed Jul. 12, 2006 Acharya et al.
U.S. Appl. No. 11/457,103, filed Jul. 12, 2006 Acharya et al.
U.S. Appl. No. 11/457,107, filed Jul. 12, 2006 Acharya et al.

(Continued)

*Primary Examiner*—David R Vincent
*Assistant Examiner*—Adrian L Kennedy
(74) *Attorney, Agent, or Firm*—Fitch, Even, Tabin & Flannery (57) ABSTRACT

A computerized method of representing a dataset with an optimal layer of a taxonomy includes obtaining a taxonomy including a hierarchical arrangement of layers, wherein each layer represents a cluster set containing at least one cluster, wherein each cluster represents at least one record within a dataset; identifying a range of taxonomy layers based on a measure of intra-cluster homogeneity of each cluster within the taxonomy; selecting a taxonomy layer within the identified range as an optimal layer of the taxonomy, the selecting being based on a measure of inter-cluster heterogeneity between clusters of a taxonomy layer within the identified range; and labeling clusters within the optimal layer of the taxonomy.

18 Claims, 5 Drawing Sheets

OTHER PUBLICATIONS

U.S. Appl. No. 11/457,115, filed Jul. 12, 2006 Acharya et al.
USPTO, Non Final Office Action from U.S. Appl. No. 11/457,115 mailed Feb. 12, 2009.
USPTO, Non Final Office Action from U.S. Appl. No. 11/457,090 mailed Feb. 10, 2009.
USPTO, Interview Summary for U.S. Appl. No. 11/457,064 mailed May 4, 2009.
USPTO, Non Final Office Action from U.S. Appl. No. 11/457,064 mailed Feb. 2, 2009.
USPTO, Non Final Office Action from U.S. Appl. No. 11/457,103 mailed Feb. 9, 2009.
USPTO, Non Final Office Action from U.S. Appl. No. 11/457,107 mailed Feb. 9, 2009.
Conrad, Jack G. et al., "Effective Document Clustering for Large Heterogeneous Law Firm Collections", pp. 177-187, Jan. 2005.
De Queiroz, Kevin et al., "Phylogeny as a Central Principle in Taxonomy: Phylogenetic Definition of Taxon Names", pp. 1-17, Dec. 2002.
Dhar, Vassant et al., "Discovering Interesting Patterns for Investment Decision Making with GLOWER—A Genetic Learner Overlaid with Entropy Reduciton", pp. 1-30, Jan. 2000.
Final Office Action from U.S. Appl. No. 11/457,103 mailed Aug. 14, 2009.
Final Office Action from U.S. Appl. No. 11/457,103 mailed Aug. 19, 2009.
Final Office Action from U.S. Appl. No. 11/457,090 mailed Aug. 19, 2009.
Notice of Allowance from U.S. Appl. No. 11/457,115 mailed Aug. 25, 2009.
Lee, John W. et al., "Hierarchical Clustering Based on Ordinal Consistency", *Department of Computing, Hong Kong Polytechnic University, Hung Hom, Kowloon, Hong Kong. Received Sep. 2, 2004, accepted May 16, 2005. Pattern Recognition 38(2005) 1913-1925.*
Lee, John W., "Order Invariant Hierarchical Clustering", *Department of Computing, Hong Kong Polytechnic University, Department of Rehabilitation Sciences, Hong Kong Polytechnic University, Hung Hom, Hong Kong, China, 2002 IEEE, 6 pgs.*
Notice of Allowance from U.S. Appl. No. 11/457,107 mailed Jul. 23, 2009.

* cited by examiner

| | |
|---|---|
| 402a | 8498618 |
| 402b | 0TopOntology-Company-BroadcastStation-TVTokyo |
| 402c | 0TopOntology-0Region-Asia-Japan |
| 402d | Best, Underway, Sports, GolfCategory, Golf, Art, 0SubCulture, Animation, Family, FamilyGeneration, Child, Kids, Family, FamilyGeneration, Child |
| ... | *** |
| 402n | Kids, Cartoon |
| ... | *** |
| ... | *** |
| ... | *** |
| ... | 20040410 |
| ... | 0930 |
| ... | 1000 |
| 402x | 30 |

OPTIMAL TAXONOMY LAYER SELECTION METHOD

This application is a continuation-in-part of U.S. application Ser. No. 11/436,142, filed May 16, 2006, entitled "CLUSTERING AND CLASSIFICATION OF CATEGORY DATA" to Acharya et al., which is incorporated in its entirety herein by reference.

BACKGROUND

1. Field of Invention

Embodiments of the present invention relate generally to methods and systems adapted to cluster categorical data. More specifically, embodiments of the present invention relate to methods and systems adapted to identify an optimal cluster set in a hierarchy of clusters.

2. Discussion of the Related Art

Data is often organized in a clustering process by separating an arbitrary dataset into a plurality of subsets (i.e., clusters) according to some inherent similarity measure between data within the dataset, wherein data within a particular cluster is characterized by some common trait or attribute. Subsequently, category labels are generated using the clusters and a classifier for the dataset is constructed using the category labels. Clustering processes can be characterized according to the manner in which they form clusters. Two common clustering techniques include partitional and hierarchical techniques.

Partitional clustering techniques organize a dataset into a single collection of clusters that usually do not overlap, wherein data within each cluster is uniformly similar. Hierarchical clustering algorithms, on the other hand, create a hierarchy of clusters representing a range (e.g., from coarse to fine) of intra-cluster similarity. Hierarchical clustering algorithms are generally classified according to the manner in which they construct the cluster hierarchy. Thus, agglomerative hierarchical clustering algorithms build the cluster hierarchy from the bottom up by progressively merging smaller clusters into larger clusters while divisive hierarchical clustering algorithms build the hierarchy from the top down by progressively dividing larger clusters to form smaller clusters.

Generally, many clustering algorithms work well when the dataset is numerical (i.e., when data within the dataset are all related by some inherent similarity metric or natural order). Numerical datasets often describe a single attribute or category. Categorical datasets, on the other hand, describe multiple attributes or categories that are often discrete, lacking a natural similarity measure between them. From the clustering perspective this also implies that the centroid of a cluster in a categorical dataset is an undefinable entity. Therefore, categorical data is usually not effectively clustered using partitional clustering techniques. Hierarchical clustering is somewhat more effective than partitional clustering techniques, but its usefulness is limited to simple pattern-matching applications and does not provide meaningful numerical quantities from the categorical dataset.

Moreover, in many clustering applications, it is desirable to identify a specific layer within the cluster tree that best describes the underlying distribution of patterns within the dataset. However, it is often difficult to identify such optimal layer that contains a unique cluster set containing an optimal number of clusters. Further, it is known that different selection criteria converge to different values of model cardinality.

Accordingly, it would be beneficial to provide a system and method capable of selecting a unique cluster set containing an optimal number of clusters.

SUMMARY

Several embodiments disclosed herein advantageously address the needs above as well as other needs by providing a system and method for selecting an optimal layer within a taxonomy.

One embodiment describes a computerized method of representing a dataset as an optimal layer of a taxonomy. The taxonomy includes a hierarchical arrangement of layers, wherein each layer represents a cluster set containing at least one cluster and each cluster represents at least one record within a dataset. According to the computerized method, a range of taxonomy layers is identified based on a measure of intra-cluster homogeneity of each cluster within the taxonomy. A taxonomy layer from within the identified range is then selected as an optimal layer of the taxonomy. The taxonomy layer can be selected based on a measure of inter-cluster heterogeneity between clusters of a taxonomy layer within the identified range. Subsequently, clusters within the optimal layer of the taxonomy can be labeled to facilitate further operations.

Another embodiment describes a computer program product including a computer usable medium having computer readable code embodied therein for causing a computer to effect obtaining the aforementioned taxonomy. The computer readable code is also adapted to cause the computer to identify a range of taxonomy layers based on a measure of intra-cluster homogeneity of each cluster within the taxonomy. Once identified, the computer readable code causes the computer to select (based on a measure of inter-cluster heterogeneity between clusters of a taxonomy layer within the identified range) a taxonomy layer within the identified range as an optimal layer of the taxonomy. Subsequently, the computer readable code causes the computer to label clusters within the optimal layer of the taxonomy.

By implementing the embodiments exemplarily described above, the optimal layer of the taxonomy can be consistently and reliably found.

BRIEF DESCRIPTION OF THE DRAWINGS

The above and other aspects, features and advantages of several embodiments exemplarily described herein will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. It is to be understood that other embodiments may be utilized and that logical, mechanical, electrical and other changes may be made without departing from the spirit or scope of the numerous disclosed embodiments of the present invention. The scope of the numerous disclosed embodiments of the present invention should be determined with reference to the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be appreciated that more or fewer processes may be incorporated into the methods illustrated in the flow diagrams discussed below without departing from the scope of the numerous disclosed embodiments of the present invention. Describing the methods by reference to a flow diagram enables one skilled in the art to develop such programs including such instructions to carry out the methods on suitably configured hardware platforms and operating environments. The computer-executable instructions may be written in a computer programming language or may be embodied in firmware logic. If written in a programming language conforming to a recognized standard, such instructions can be executed on a variety of hardware platforms and operating environments and for interface to a variety of operating systems. In addition, embodiments of the present invention are not described with reference to any particular programming language. It will be appreciated that a variety of programming languages may be used to implement the teachings of the disclosed embodiments.

Figure 1:
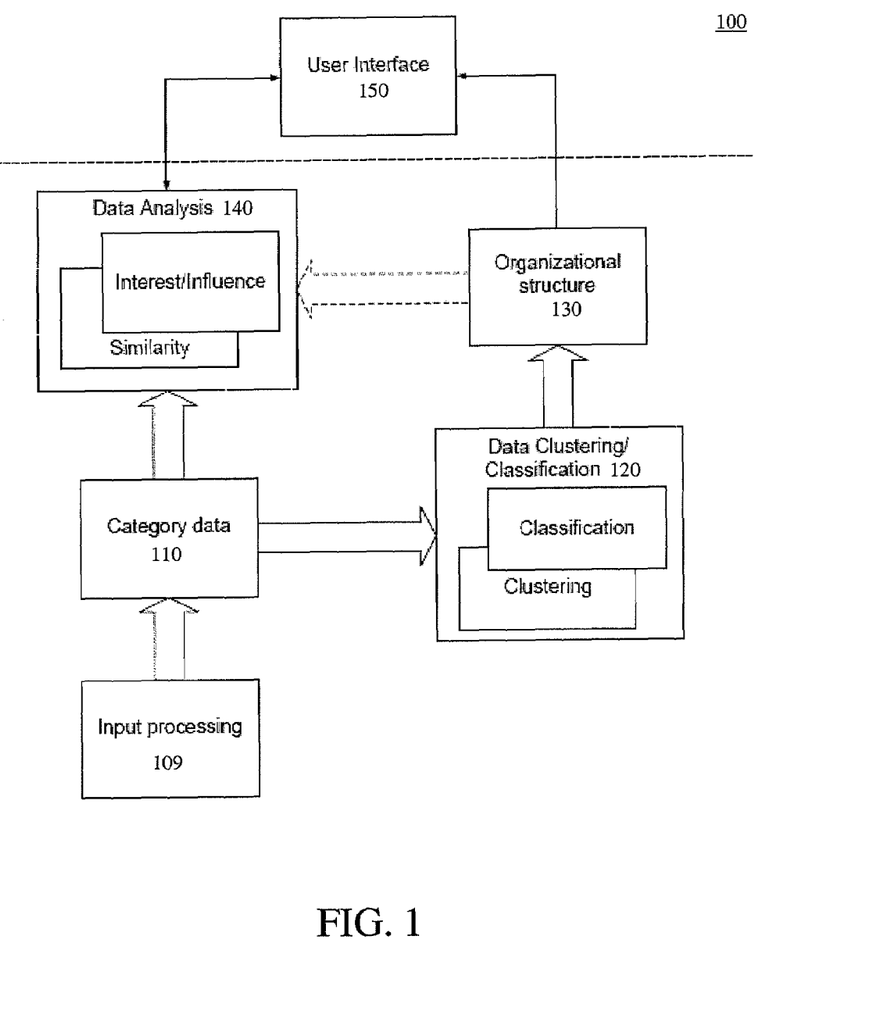
FIG. 1 illustrates a diagram of a system for assisting a user in searching and automatically organizing information.

FIG. 1 illustrates a diagram of a system 100 for assisting a user in searching and automatically organizing information, such as content, which can be characterized by categorical data 110. Such content may be, for example, recorded TV programs, electronic program guide (EPG) entries, and multimedia content. The system 100 may further assist the user in tracking preferences of the user, and may also provide recommendations to the user. The system 100 can further be used by the user to search by example and/or by query.

As shown in FIG. 1, the system 100 includes an input processing module 109, a clustering/classification module 120, a data analysis module 140, and a user interface 150. Also shown in FIG. 1 are categorical data 110 and an organizational structure 130.

Categorical data describes multiple attributes or categories. Often the categories are discrete and lack a natural similarity measure between them. The system 100 includes an input processing module 109 to pre-process input data into categorical data and load the categorical data 110.

The categorical data 110 is grouped into clusters, and/or classified into folders by the clustering/classification module 120. The category and classification methods described herein can operate on any arbitrary categorical dataset. Generally, clustering of categorical data 110 is the process of identifying a set of underlying patterns in categorical data points within a data set and grouping the data points into one or more groups or clusters based on some measure of similarity.

The knowledge of category distribution obtained in the process of clustering is used to construct a classifier for some data spaces. Classification is the task of assigning data points to one or more of the identified categories based on some predefined proximity or divergence measure.

In one embodiment, the clustering/classification module 120 uses a folder-based classification system. The folder-based classification system allows a user to build a classifier by creating a group of folders. Each folder within the group is instantiated by a number of exemplary categorical data records.

In one embodiment, one or more of the exemplary records may be input by the user. Accordingly, a group of folders created by the user may act as a classifier such that new categorical data records are compared against the user-created group of folders and automatically sorted into the most appropriate folder. The folder-based classifier automatically creates a collection of folders, and automatically adds and deletes folders to or from the collection. The folder-based classifier may also automatically modify the contents of other folders not in the collection.

The output of the clustering/classification module 120 is an organizational data structure 130, such as a dendrogram, a cluster tree, or a matrix, collectively referred to herein as a taxonomy. A cluster tree may be used as an indexed organization of the categorical data or to select a suitable cluster of the data.

Many clustering applications require identification of a specific layer within a cluster tree that best describes the underlying distribution of patterns within the categorical data. In one embodiment, an output of the clustering/classification module 120 includes an optimal layer that contains a unique cluster group containing an optimal number of clusters. According to numerous embodiments disclosed herein, optimal layers may be selected based on entropic measures.

A data analysis module 140 may use the folder-based classifiers and/or classifiers generated by clustering operations for automatic recommendation or selection of content. The data analysis module 140 may automatically recommend or provide content that may be of interest to a user or may be similar or related to content selected by a user. In one embodiment, the data analysis module 140 assigns categorical data records for new content items with the appropriate folders based on similarity.

A user interface 150 also shown in FIG. 1 is designed to assist the user in searching and automatically organizing content using the system 100.

Although shown in FIG. 1 as specific separate modules, the clustering/classification module 120, organizational data structure 130, and the data analysis module 140 may be implemented as different separate modules or may be combined into one or more modules.

Figure 2:
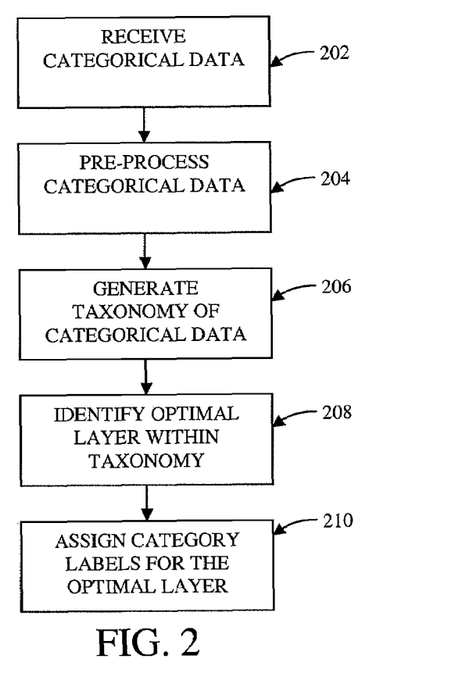
FIG. 2 illustrates an exemplary process of identifying an optimal layer within a taxonomy in accordance with embodiments of the present invention.

FIG. 2 illustrates an exemplary process of generating a taxonomy and selecting an optimal layer within the taxonomy in accordance with embodiments of the present invention.

Referring to FIG. 2, an exemplary process flow of processing categorical data proceeds as follows: receive input data (202), pre-process the received input data into the aforementioned categorical data (204), generate a taxonomy of the pre-processed categorical data (206), identify an optimal layer within the taxonomy (208), and assign category labels for the optimal layer (210).

In one embodiment, the input data received at 202 includes a plurality of records electronically input into the system 100. As used herein, a record can be a document, a video, photograph, music, or the like, or any combination thereof.

An exemplary process flow of pre-processing the dataset at 204 is discussed below with respect to FIG. 3.

Figure 3:
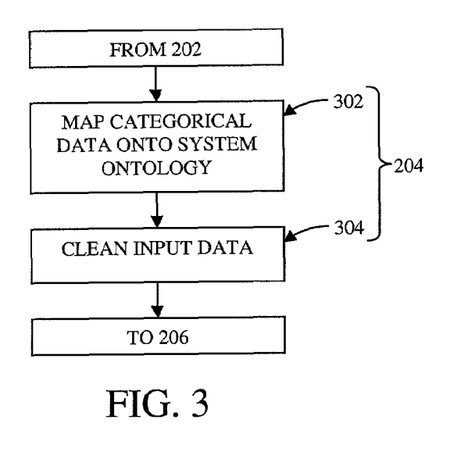
FIG. 3 illustrates an exemplary pre-processing method as applied to categorical data in accordance with embodiments of the present invention.

Referring to FIG. 3, each record is mapped onto a system ontology (302) and the dataset formed from the records is "cleaned" (304).

In one embodiment, records within the received dataset can be mapped onto predetermined fields of a system ontology at 302. The format of the data, the transformations expected, and the format of the output data are specified in a language designed to describe metadata such as RDF. RDF employs a graph-based data model with a well-defined entailment relation. RDF is expressed in an XML format, the syntax of which explicitly specifies the parameters required and simplifies specification of the transformation process.

Figure 4:
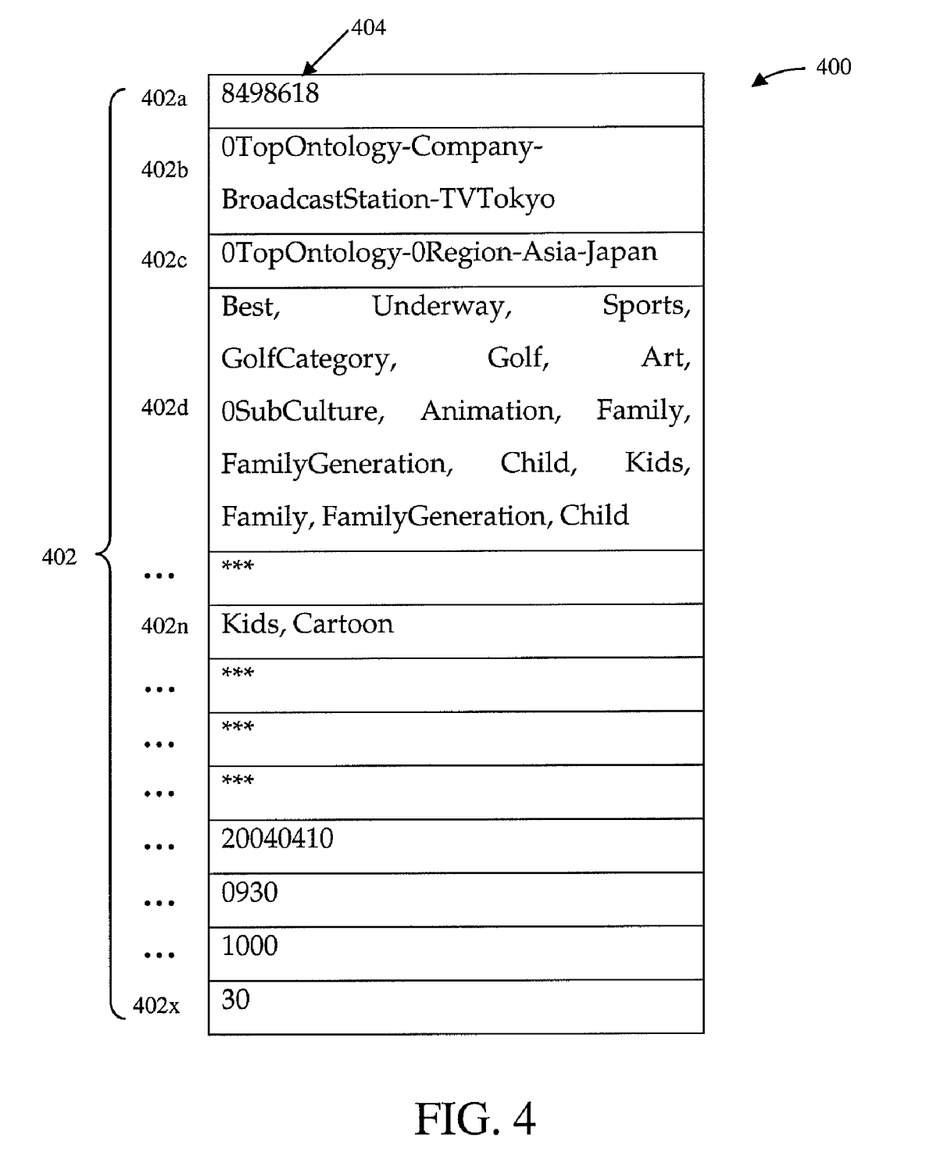
FIG. 4 illustrates an exemplary ontology onto which records containing categorical data are mapped in accordance with embodiments of the present invention.

FIG. 4 illustrates an exemplary ontology onto which records containing categorical data are mapped in accordance with embodiments of the present invention.

As shown in FIG. 4, the ontology 400 is characterized by a plurality of attributes 402 (i.e., 402a to 402x), wherein each attribute is further characterized by one or more terms 404. In one embodiment, the predetermined ontology adds abstract terms to particular attributes of a record to facilitate processing of the electronic record by the system 100. The ontology thus provides a means for uniformly representing records in a manner that the system 100 can recognize efficiently.

As shown in FIG. 4, a received record can be a document describing a particular television program. Data mapped into a first attribute 402a (i.e., an "identification attribute") corresponds to record identifier (e.g., a particular television program) and is characterized by the term "8498618"; data mapped into another attribute 402d (i.e., a "descriptor attribute") corresponds to keywords for the television program identified in attribute 402a and is characterized by the terms listed from "Best" to "Child"; data mapped into attribute 402n (i.e., a "genre attribute") corresponds to the genre for the television program identified in attribute 402a and is characterized by the terms "Kids" and "Cartoon"; data mapped into other attributes correspond to the date, start time, end time, duration, of the television program identified in attribute 402a and are characterized by the terms "20040410", "0930", "1000", and "30", respectively. In one embodiment, the term "*" represents missing data. In another embodiment, the same term can appear multiple times within the same attribute (e.g., the keyword attribute 402d** contains multiple instances of the term "Family". In the illustrated embodiment, terms such as "0SubCulture" are abstract terms supplemented by the ontology.

Records are represented within the system as vectors. The dimension of each vector corresponds to the total number of terms characterizing all attributes found in all records processed by the system (i.e., the global vocabulary of the system). Values assigned to components of a vector represent the presence of a term within a corresponding record. For example, a vector component can be binarily represented as either a 0 (indicating the absence of a term from a record) or a 1 (indicating the presence of a term in a record).

For example, suppose that the vocabulary for the entire collection of records and attributes (i.e., the global vocabulary) consists of only six terms: A, B, C, D, E, and F. Let a first record $d_1$ include the terms A, B, D, and E and a second record $d_2$ include the terms C, D, and F. Accordingly, the first record $d_1$ can be binarily represented by a six-dimensional vector $d_1=\{1, 1, 0, 1, 1, 0\}$ and the second record $d_2$ can be binarily represented by a six-dimensional vector $d_2=\{0, 0, 1, 1, 0, 1\}$, wherein values of the vector component corresponding to the terms "A" and "B" are 1 for the first record $d_1$ and 0 for the second record $d_2$ (i.e., $d_1[A]=1$, $d_1[B]=1$, $d_2[A]=0$, and $d_2[B]=0$), the value of the vector component corresponding to the term "C" is 0 for the first record $d_1$ and 1 for the second record $d_2$ (i.e., $d_1[C]=0$, $d_2[C]=1$), and so on. As shown above, the global vocabulary consists of only six terms. In practice, however, the global vocabulary includes thousands of terms, wherein any particular record includes only a relatively small number of terms. Accordingly, only a relatively few number of vector components are assigned non-zero values. In practice, therefore, records are typically represented as highly "sparse" vectors that can be difficult to process to efficiently generate folder sets and yield inaccurate results. To increase the efficiency with which folder sets are generated, and to produce more accurate results, each record is "cleaned" at 304.

In other embodiments, vector components can be numerically represented (as opposed to binarily represented) by a value corresponding to the number of times that a term occurs in a record (i.e., the frequency of the term in the record) or by a normalized value corresponding to the number of times that a term occurs in a record in addition to the total number of terms the record contains (i.e., the normalized frequency of the term in the record). An exemplary process flow of performing the cleaning at 304 is discussed below with respect to FIG. 5.

Figure 5:
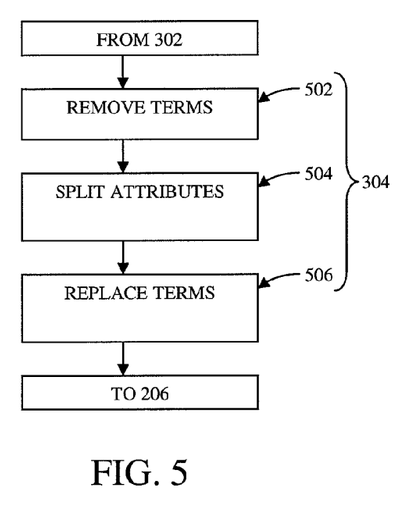
FIG. 5 illustrates an exemplary process of cleaning categorical data in accordance with embodiments of the present invention.

Referring to FIG. 5, a record can be cleaned, for example, by removing terms (502), splitting attributes (504), and replacing terms (506).

In one embodiment, terms can be removed by removing terms from attributes that are not generally useful in generating a folder set or in classifying records based on the generated folder set. Non-useful terms can be identified as those that occur infrequently (e.g., once) within a particular attribute of a record. By removing terms from each record, the total number of terms within the attribute vocabulary can be significantly reduced. For example, suppose the system receives 2154 records describing television programs playing over the course of a week. Such a collection of records may include 3016 description keywords, wherein each record contains an average of 5.37 keywords, wherein each keyword occurs an average of 4.29 times, and wherein 1113 keywords occur just once. By removing the keywords occurring just once, the size of the description keyword attribute space can be reduced by about 33%.

In one embodiment, the attributes are split by splitting large record attributes (i.e., attributes characterized by a large number of unique terms) into a plurality of smaller sub-attributes characterized by a smaller number of unique terms. By splitting a large record attribute into small sub-attributes, probabilities can be normalized over smaller, less sparse domains and yield more accurate results. Further, each sub-attribute can be weighted to reflect its relative importance within the record.

In one embodiment, a large attribute can be split into a plurality of smaller sub-attributes by grouping terms within the large attribute based on their frequency of occurrence within the large attribute. In this case, it is assumed that terms occurring more frequently are more relevant, and thus more important, than terms occurring less frequently). As a result, information indicating relevance levels of particular sub-attributes is imparted and used as a weighting value to reflect the relative importance of each sub-attribute. The size and number of the sub-attributes created as a result of the splitting can be controlled, for example, by specifying the proportions of frequencies or value of frequencies desired in each sub-attribute.

In another embodiment, a large attribute can be split into a plurality of sub-attributes by grouping semantically-related terms. In this case, meanings of words may be internally generated or obtained from a lexical reference system such as WordNet, a lexical reference system developed at the Cognitive Science Laboratory at Princeton University. As a result, information indicating a certain degree of "common-sense" is imparted and used as a weighting value to reflect the relevance of each sub-attribute. The size and number of the sub-attributes created as a result of the splitting can be controlled using statistics about particular terms and term frequencies in the attribute. In one embodiment, the total number of occurrences of terms within each sub-attribute can be maintained within a predetermined range to control the degree of relatedness between terms in a particular sub-attribute or to control the abstractness of relationships between terms within a sub-attribute.

In one embodiment, terms that can be grouped together into a sub-attribute according to their semantic interrelatedness are identified using an "is-a" (hypernym) chain relation as applied to nouns.

Consider, for example, the following hypernym chains:

1. cat, feline, carnivore, placental, mammal, vertebrate, chordate, animal, organism, living thing, object, entity 2. dog, canine, carnivore, placental, mammal, vertebrate, chordate, animal, organism, living thing, object, entity 3. umbrella, canopy, shelter, protective covering, covering, artifact, object, entity Based on the first hypernym chain, a cat is a feline, a feline is a carnivore, etc. Based on the second hypernym chain, a dog is a canine, a canine is a carnivore, etc. Based on the third hypernym chain, an umbrella is a canopy, a canopy is a shelter, etc. As shown, the terms 'cat' and 'dog' share the 'carnivore' hypernym relation much earlier in the chain than they share the 'object' hypernym relation with the term 'umbrella'. Accordingly, the term 'cat' is more semantically related to the term 'dog' than it is related to the term 'umbrella'. As a result, a large attribute containing the terms 'cat,' 'dog,' and 'umbrella' will be split into a first sub-attribute containing the terms 'cat' and 'dog' and a second sub-attribute containing the term 'umbrella.' As will be appreciated, semantic relationships between terms changes as the structural taxonomy of the lexical reference system changes or as classes are inserted into or removed from a particular relation path. It will be appreciated, however, that terms other than the nouns appearing in WordNet can be grouped in a separate attribute space and downweighted if necessary.

In the example provided above, where the received records identify television programs, one large attribute may, for example, be divided into two smaller sub-attributes, wherein the first sub-attribute, related to recreation, contains the terms 'Recreation', 'Pachinko', 'Hobby', 'Fun', 'Entertainment', 'Encore', 'Swimming', 'Skating', 'Gymnastics', 'Hunting', 'Fishing', 'Tennis', 'Basketball', 'Golf', 'Soccer', 'Baseball', and 'Athletics' while the second sub-attribute, related to food, contains the terms 'Tofu', 'Food', 'Diet', 'Vitamin', 'Sushi', 'Soup', 'Pudding', 'Dessert', 'Chocolate', and 'Beverage'. In one embodiment, each of the terms identified above can be further divided into smaller sub-attributes according to a semantic relatedness between the terms.

In one embodiment, terms can be replaced by replacing specific terms with equivalent, more abstract terms. In this case, terms found, for example, in WordNet can be replaced with equivalent, more abstract terms. As a result, the number of unique terms characterizing an attribute of a record can be reduced because several specific terms can be mapped onto the same abstract term. Moreover, vector representations of records become much less sparse because each abstract term appears in more records and there are proportionately more abstract terms appearing in each record. The size and number of the sub-attributes created as a result of the term replacements can be controlled using statistics about particular terms and term frequencies in the attribute.

In the example provided above, where the received records identify television programs, the specific terms 'Brother', 'Sister', 'Grandchild', 'Baby', 'Infant', 'Son', 'Daughter', 'Husband', 'Mother', 'Parent', and 'Father' of an attribute can all be mapped onto an equivalent abstract term 'relative'. Similarly, the specific terms 'Hunting', 'Fishing', 'Gymnastics', 'Basketball', 'Tennis', 'Golf', 'Soccer', 'Football', and 'Baseball' of an attribute can all be mapped onto an equivalent abstract term 'sport'.

By cleaning each record as exemplarily described above with respect to FIG. 5, the total number of terms to be processed by the system 100 and/or the sparsity of vectors that represent records can be reduced. As a result, the efficiency with which folder sets are ultimately generated by the system 100, and the accuracy of results ultimately yielded may be increased. In one embodiment, the dataset D produced as a result of the pre-processing at 204 contains m records $d_1, d_2, \ldots, d_m$ and is characterized by an attribute space containing d attributes, $A_1, A_2, \ldots, A_d$. A generic attribute space $A_i$, where $i=1, \ldots, d$, can be characterized by any combination of $n_i$ unique terms contained within a vocabulary $V_i = \{v_i^1, v_i^2, \ldots, v_i^{n_i}\}$ specific to $A_i$. Accordingly, a global vocabulary V contains n unique terms characterizing the global attribute space A (i.e., a combination of all attributes within the dataset D), such that $n=\Sigma_{i=1}^{d} n_i$. The dataset D can be represented as an m×n matrix. Accordingly, each row of the m×n matrix corresponds to a vector-space representation of a particular record.

Once the categorical data has been pre-processed, a taxonomy can be generated at 206. The taxonomy, Γ, generated at 206 is a taxonomy of the dataset D resulting from the pre-processing at 204. A given layer $\Gamma_t$ within the taxonomy Γ contains a set of k(t) clusters nested within a hierarchically higher layer $\Gamma_{t+1}$, containing a set of k(t+1) clusters (k(t+1) <k(t)), such that $\Gamma_t \subset \Gamma_{t+1}$. Thus, each cluster in $\Gamma_t$ is a subset of a cluster in $\Gamma_{t+1}$ and at least one cluster in $\Gamma_t$ is a proper subset of a cluster in $\Gamma_{t+1}$. Such a taxonomy is also commonly known as a dendrogram.

In one embodiment, the taxonomy Γ comprises k mutually exclusive clusters (where k≦m) distributed within h nested layers $\Gamma_1 \subset \Gamma_2 \subset \ldots \subset \Gamma_h$. The uppermost layer $\Gamma_h$ of the taxonomy contains one cluster containing all of the m records and, therefore, corresponds to the size of the dataset D. The bottommost layer of the taxonomy, $\Gamma_1$, contains m singleton leaf clusters, each corresponding to one of the m records within the dataset D. Accordingly, the taxonomy Γ comprises k clusters $C_1, C_2, \ldots, C_k$, such that the following conditions are satisfied:

1. For all i=1, ..., k, $C_i$ is a non-null subset;

2. For all i, j=1, ..., k, i≠j, $C_i$ and $C_j$ are non-overlapping, i.e., $C_i \cap C_j$ is null; and 3. All the clusters, when combined together, are exhaustive, i.e., $\cup_{i=1}^{k} C_i = D$.

As discussed above, each record $d_i \in D$ is identified as a vector. Accordingly, the bottommost layer of the taxonomy, $\Gamma_1$, contains a set of m clusters $C_1^1, C_1^2, \ldots, C_1^m$, each of which are also identified by the underlying vector of the corresponding record (i.e., $C_1^i = d_i$ for all i=1, ..., m). Moreover, all leaf clusters $C_1^1, C_1^2, \ldots, C_1^m$ are ultimately merged together to form a branch cluster. Accordingly, each branch cluster represents the union of a plurality of leaf and/or other branch clusters. In one embodiment, therefore, each branch cluster can be identified by an underlying vector identifying the centroid of the plurality of clusters it contains. For the sake of ease of exposition, no formal distinction will be drawn between a leaf or branch cluster and the underlying vector identifying the leaf or branch cluster.

It will be appreciated that the taxonomy Γ can be generated at 206 by any suitable method. In one embodiment, the taxonomy Γ can be generated according to a process exemplarily described copending application Ser. No. 11/457,064 entitled "METHOD AND SYSTEM FOR SUBSPACE BOUNDED RECURSIVE CLUSTERING OF CATEGORICAL DATA," application Ser. No. 11/457,090 entitled "METHOD AND SYSTEM FOR ORDER INVARIANT CLUSTERING OF CATEGORICAL DATA," application Ser. No. 11/457,103 entitled "DATA AUGMENTATION BY IMPUTATION," and/or application Ser. No. 11/457,115 entitled "METHOD AND SYSTEM FOR SEED BASED CLUSTERING OF CATEGORICAL DATA," all of which are incorporated by reference as if fully set forth herein.

Referring back to FIG. 2, after the taxonomy has been generated at 206, an optimal layer within the taxonomy is identified at 208. In accordance with general principles of the present invention, intra-cluster homogeneity can be represented by information content of a layer $\Gamma_t$ and can be characterized by the mutual information $I(A, \Gamma_t)$ that it provides regarding the global vocabulary V (i.e., the global attribute space A). Accordingly, the mutual information can be obtained as follows:

$$I(A, \Gamma_t) = H(A) - H(A|\Gamma_t),$$

where H(A) is the absolute entropy and $H(A|\Gamma_t)$ is the $\Gamma_t$ conditional entropy of A. Progressing from the bottommost layer $\Gamma_1$ of the taxonomy Γ toward the topmost layer $\Gamma_h$, information about A is lost. Conversely, progressing from the topmost layer $\Gamma_h$ of the taxonomy Γ toward the bottommost layer $\Gamma_1$, information about A is gained. Thus, the information gain from layer $\Gamma_t$ to layer $\Gamma_{t-1}$ is characterized as the differential mutual information:

$$\delta I(\Gamma_t, \Gamma_{t-1}) = I(A, \Gamma_{t-1}) - I(A, \Gamma_t) = H(A|\Gamma_{t-1}) - H(A|\Gamma_t).$$

When t is small, the information gain rate $\delta^2 I_t$ is relatively high and as t approaches h, the information gain rate decreases asymptotically. Accordingly, an optimal value for t is identified, at least in part, based on where the information gain from layer $\Gamma_t$ to layer $\Gamma_{t-1}$ is not very high and where the information gain rate $\delta^2 I_t$ has diminished by a predetermined amount.

In one embodiment, inter-cluster heterogeneity can be represented by the attribute-conditional cluster entropy $H(\Gamma_t|A)$ of a layer $\Gamma_t$. It has been found that lower values of the attribute-conditional cluster entropy $H(\Gamma_t|A)$ imply more homogeneity within clusters of a layer $\Gamma_t$ and more heterogeneity across clusters of a layer $\Gamma_t$. Accordingly, an optimal value for t is identified, at least in part, based on where the attribute-conditional cluster entropy $H(\Gamma_t|A)$ is low.

Figure 6:
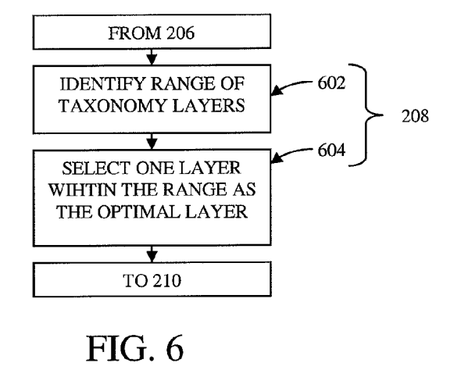
FIG. 6 illustrates an exemplary process of selecting an optimal layer within the taxonomy in accordance with embodiments of the present invention.

Referring to FIG. 6, an exemplary method of identifying an optimal layer within the taxonomy generated at 206 includes, for example, identifying a range of taxonomy layers within the taxonomy Γ generated at 206 (602) and identifying a layer within the identified range as the optimal layer (604).

In one embodiment, both the range of taxonomy layers can be identified and the optimal layer can be selected according to predetermined entropic measures representing intra-cluster homogeneity and inter-cluster heterogeneity specific to the layer. In view of the above, identification of the optimal layer from the taxonomy Γ is based off of the process flow exemplarily described with respect to FIG. 7.

Figure 7:
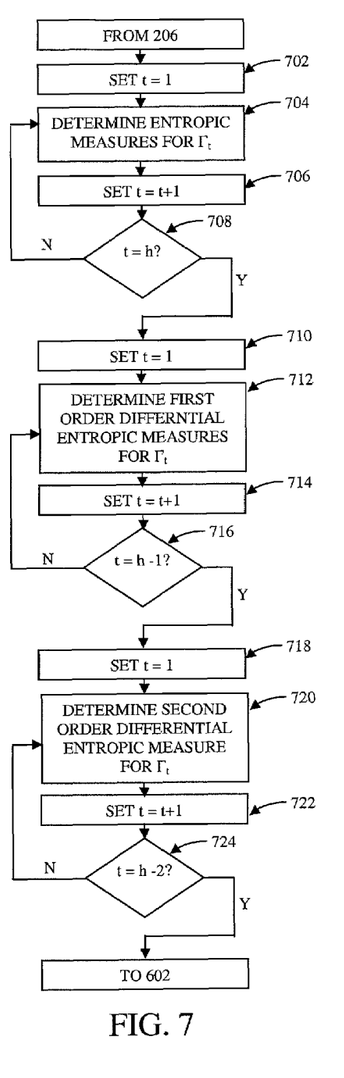
FIG. 7 illustrates an exemplary process of calculating entropic measures for each layer within the taxonomy generated in connection with the process shown in FIG. 2.

Referring to FIG. 7, the taxonomy layer variable t is set to one (702), the entropic measures for $\Gamma_t$ are calculated (704), the taxonomy layer variable t is incremented by one (706), and, at 708, it is determined whether the incremented taxonomy layer variable t equals the total number of layers h in the taxonomy Γ.

If, at 708 it is determined that the incremented taxonomy layer variable t≠h, then the process flow is redirected to 704. If, at 708 it is determined that the incremented taxonomy layer variable t=h, then the incremented taxonomy layer variable t is reset to one (710), the first order differential entropic measures for $\Gamma_t$ are calculated (712), the taxonomy layer variable t is incremented by one (714), and, at 716, it is determined whether the incremented taxonomy layer variable t equals h−1.

If, at 716 it is determined that the incremented taxonomy layer variable t≠h−1, then the process flow is redirected to 712. If, at 716 it is determined that the incremented taxonomy layer variable t=h−1, then the incremented taxonomy layer variable t is reset to one (718), the second order differential entropic measures for $\Gamma_t$ are calculated (720), the taxonomy layer variable t is incremented by one (722), and, at 724, it is determined whether the incremented taxonomy layer variable t equals h−2. If, at 724 it is determined that the incremented taxonomy layer variable t≠h−2, then the process flow is redirected to 720. Otherwise, the process flow continues to 602.

In one embodiment, the entropic measures calculated for each layer $\Gamma_{t\in\{1, 2, \ldots, h\}}$ in 704 include the entropy $H(\Gamma_t)$ over the set of clusters belonging to each layer $\Gamma_t$, the cluster-conditional entropy $H(A|\Gamma_t)$ of each layer $\Gamma_t$ over the attribute space A, the attribute-conditional entropy $H(\Gamma_t|A)$ over the set of clusters belonging to each layer $\Gamma_t$, and the aforementioned mutual information $I(A, \Gamma_t)$ between the attribute space and the set of clusters belonging to each layer $\Gamma_t$. The attribute-conditional entropy $H(\Gamma_t|A)$ can be obtained as follows:

$$H(\Gamma_t|A)=H(\Gamma_t)-H(A|\Gamma_t)+H(A).$$

In one embodiment, the first order differential entropic measures calculated for each layer $\Gamma_{t\in\{1, 2, \ldots, h-1\}}$ at 712 include the first order differential of the attribute-conditional entropy $\partial H_t$ and the first order differential of the mutual information $\partial I_t$ for each layer $\Gamma_t$. The first order differential attribute-conditional entropy $\partial H_t$ can be obtained as follows:

$$\partial H_t = H(\Gamma_{t-1}|A) - H(\Gamma_t),$$

and the first order differential of the mutual information $\partial I_t$ can be obtained as follows:

$$\partial I_t = I(A, \Gamma_{t-1}) - I(A, \Gamma_t).$$

In one embodiment, the second order differential entropic measures calculated for each layer $\Gamma_{t\in\{1, 2, \ldots, h-2\}}$ at 720 include the second order differential of the mutual information $\partial^2 I_t$ for each layer $\Gamma_t$. The second order differential of the mutual information $\partial^2 I_t$ can be obtained as follows:

$$\partial^2 I_t = \partial I(A, \Gamma_{t-1}) - \partial I(A, \Gamma_t).$$

After having calculated the entropic measures for $\Gamma_t$ (in addition to the first and second order differentials) as discussed above with respect to FIG. 7, the optimal taxonomy layer may be identified as exemplarily discussed below with respect to FIG. 8.

Figure 8:
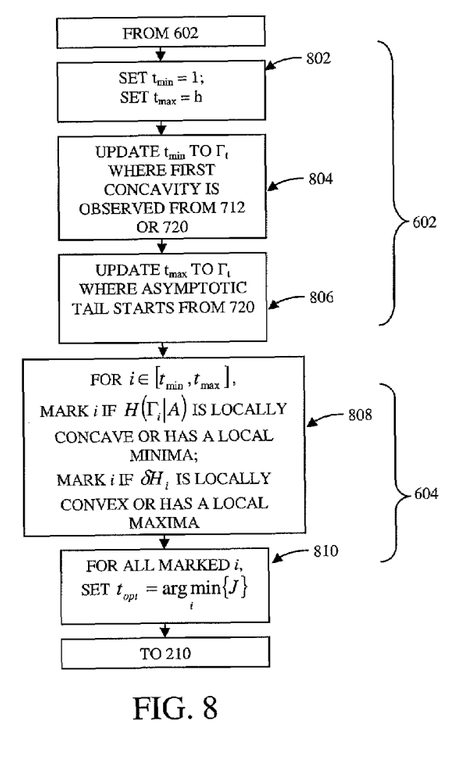
FIG. 8 illustrates an exemplary process of selecting an optimal layer from a range of layers within the taxonomy in connection with the process shown in FIG. 6.

Referring to FIG. 8, a range of taxonomy layers within the taxonomy $\Gamma$ can be identified at 602 by, for example, setting a lower bound range variable, $t_{min}$, equal to the bottommost (i.e., first) taxonomy layer $\Gamma_1$ and setting an upper bound range variable, $t_{max}$, equal to the topmost (i.e., second) taxonomy layer $\Gamma_h$ (802), updating the lower bound range variable, $t_{min}$, to a value of t where a first predetermined condition is satisfied by $\Gamma_t$ (804) (e.g., where a first concavity in either a first order differential entropic measure (e.g., the first order differential of the mutual information $\partial I_t$) or a second order differential entropic measure is first observed/exhibited in $\Gamma_t$), and updating the upper bound range variable, $t_{max}$, to a value of t where a second predetermined condition is satisfied by $\Gamma_t$ (806) (e.g., where an asymptotic tail in the second order differential entropic measure is first observed in $\Gamma_t$). Thus, upper bound range variable, $t_{max}$, is updated to a value of t for a taxonomy layer that exhibits a beginning of an asymptotic tail. As a result of the aforementioned process, a plurality of taxonomy layers $$\sum_{i=t_{min}}^{t_{max}} \Gamma_i$$

within the range of taxonomy layers bounded by $\Gamma_{t_{min}}$ and $\Gamma_{t_{max}}$ can be identified.

In one embodiment, the lower bound range variable, $t_{min}$, can be updated at 804 by, for example, setting $t_{min}=\min\{\{\arg_t\min\{\partial I_t<(\partial I_{t-1}+\partial I_{t+1})/2\}\},\{\arg_t\min\{\partial^2 I_t<(\partial^2 I_{t-1}+\partial^2 I_{t+1})/2\}\}\}$. In one embodiment, the upper bound range variable, $t_{max}$, at 806 by, for example, setting $t_{max}=\min\{\arg_t\min\{\partial I_t<\partial\}\}$, where $\partial$ is a predetermined value representing maximum allowable information loss.

Subsequently, an optimal layer can be selected from the range of taxonomy layers at 604 by marking each taxonomy layer $\Gamma_i$ that satisfies a third predetermined condition. For example, a taxonomy layer $\Gamma_i$ may be marked if the attribute-conditional entropy $H(\Gamma_i|A)$ for that layer is locally concave or has a local minima or if the first order differential attribute-conditional entropy $\partial H_i$ for that layer is locally convex or has a local maxima (808) and selecting the bottommost taxonomy layer $\Gamma_i$ of the set of marked taxonomy layers $\Gamma_i$ (i.e., the marked taxonomy layer closest to the lower bound of the range of taxonomy layers) (810). By selecting an optimal layer $t_{opt}$ as described above, the optimal layer within the taxonomy can be reliably found based on entropic measures.

Referring back to FIG. 2, category labels are assigned to each cluster within the layer identified at 208 (210). In one embodiment, each category label is descriptive of the contents of the cluster it is assigned to and can be assigned manually and/or automatically by the system by any known means. In another embodiment, the category label for each cluster corresponds to the centroid of that cluster. After the optimal taxonomy layer has been selected, the categorical dataset D can be classified. An exemplary process of classifying records within the categorical dataset can include treating the selected taxonomy layer as a nearest neighbor classifier.

While embodiments of the present invention herein disclosed have been described by means of specific examples and applications thereof, numerous modifications and variations could be made thereto by those skilled in the art without departing from the scope of embodiments of the present invention set forth in the claims.

What is claimed is:

1. A computerized method of representing a dataset with an optimal layer of a taxonomy, comprising:

obtaining a taxonomy including a hierarchical arrangement of layers, wherein each layer represents a cluster set containing at least one cluster, wherein each cluster represents at least one record within a dataset;

identifying a range of taxonomy layers based on a measure of intra-cluster homogeneity of each cluster within the taxonomy;

selecting a taxonomy layer within the identified range as an optimal layer of the taxonomy, the selecting being based on a measure of inter-cluster heterogeneity between clusters of a taxonomy layer within the identified range; and labeling clusters within the optimal layer of the taxonomy;

wherein selecting a taxonomy layer within the identified range as an optimal layer of the taxonomy comprises:

marking all taxonomy layers within the identified range having a measure of inter-cluster heterogeneity that satisfies a first predetermined condition;

selecting a marked taxonomy layer closest to a lower bound of the identified range; and wherein the computerized method of representing a dataset with a taxonomy occurs within a physical computer.

2. The method of claim 1, wherein identifying a range of taxonomy layers comprises:

identifying a first taxonomy layer having a measure of intra-cluster homogeneity that satisfies a second predetermined condition as a lower bound of the range; and identifying a second taxonomy layer having a measure of intra-cluster homogeneity that satisfies a third predetermined condition as an upper bound of the range.

3. The method of claim 2, wherein the second predetermined condition is satisfied when the measure of intra-cluster homogeneity for a taxonomy layer exhibits a first concavity.

4. The method of claim 3, wherein the measure of intra-cluster homogeneity comprises a value of a first order differential of mutual information between an attribute space defined by the dataset and a taxonomy layer.

5. The method of claim 3, wherein the measure of intra-cluster homogeneity comprises a value of a second order differential of mutual information between an attribute space defined by the dataset and a taxonomy layer.

6. The method of claim 2, wherein the third predetermined condition is satisfied when the measure of intra-cluster homogeneity for a taxonomy layer exhibits a beginning of an asymptotic tail.

7. The method of claim 6, wherein the measure of intra-cluster homogeneity comprises a value of a first order differential of mutual information between an attribute space defined by the dataset and a taxonomy layer.

8. The method of claim 1, wherein the first predetermined condition is satisfied when the measure of inter-cluster heterogeneity for a taxonomy layer is locally concave or has a local minima.

9. The method of claim 1, wherein the third predetermined condition is satisfied when a first order differential of the measure of inter-cluster heterogeneity for a taxonomy layer is locally convex or has a local maxima.

10. A computer program product comprising a physical computer usable medium having computer readable code embodied therein for causing a physical computer to effect:

obtaining a taxonomy including a hierarchical arrangement of layers, wherein each layer represents a cluster set containing at least one cluster, wherein each cluster represents at least one record within a dataset;

identifying a range of taxonomy layers based on a measure of intra-cluster homogeneity of each cluster within the taxonomy;

selecting a taxonomy layer within the identified range as an optimal layer of the taxonomy, the selecting being based on a measure of inter-cluster heterogeneity between clusters of a taxonomy layer within the identified range; and labeling clusters within the optimal layer of the taxonomy;

wherein the computer usable medium has computer readable code embodied therein for causing a computer to effect selecting a taxonomy layer within the identified range as an optimal layer of the taxonomy by:

marking all taxonomy layers within the identified range having a measure of inter-cluster heterogeneity that satisfies a first predetermined condition; and selecting a marked taxonomy layer closest to a lower bound of the identified range.

11. The computer program product of claim 10, wherein the computer usable medium has computer readable code embodied therein for causing a computer to effect identifying a range of taxonomy layers by:

identifying a first taxonomy layer having a measure of intra-cluster homogeneity that satisfies a second predetermined condition as a lower bound of the range; and identifying a second taxonomy layer having a measure of intra-cluster homogeneity that satisfies a third predetermined condition as an upper bound of the range.

12. The computer program product of claim 11, wherein the second predetermined condition is satisfied when the measure of intra-cluster homogeneity for a taxonomy layer exhibits a first concavity.

13. The computer program product of claim 12, wherein the measure of intra-cluster homogeneity comprises a value of a first order differential of mutual information between an attribute space defined by the dataset and a taxonomy layer.

14. The computer program product of claim 12, wherein the measure of intra-cluster homogeneity comprises a value of a second order differential of mutual information between an attribute space defined by the dataset and a taxonomy layer.

15. The computer program product of claim 11, wherein the third predetermined condition is satisfied when the measure of intra-cluster homogeneity for a taxonomy layer exhibits a beginning of an asymptotic tail.

16. The computer program product of claim 15, wherein the measure of intra-cluster homogeneity comprises a value of a first order differential of mutual information between an attribute space defined by the dataset and a taxonomy layer.

17. The computer program product of claim 10, wherein the first predetermined condition is satisfied when the measure of inter-cluster heterogeneity for a taxonomy layer is locally concave or has a local minima.

18. The computer program product of claim 10, wherein the first predetermined condition is satisfied when a first order differential of the measure of inter-cluster heterogeneity for a taxonomy layer is locally convex or has a local maxima.

* * * * *

UNITED STATES PATENT AND TRADEMARK OFFICE
CERTIFICATE OF CORRECTION

| | | |
|---|---|---|
| PATENT NO. | : 7,640,220 B2 | Page 1 of 1 |
| APPLICATION NO. | : 11/457095 | |
| DATED | : December 29, 2009 | |
| INVENTOR(S) | : Chiranjit Acharya | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this

Twenty-first Day of December, 2010

David J. Kappos
*Director of the United States Patent and Trademark Office*